United States Patent [19]

Klievoneit et al.

[11] Patent Number: 4,470,187
[45] Date of Patent: Sep. 11, 1984

[54] PROCESS FOR TRUING A PLURALITY OF JOURNAL BEARINGS TO A COMMON BORE AXIS

[75] Inventors: Harold R. Klievoneit, Mesa; Augustine G. Esposito, Phoenix, both of Ariz.

[73] Assignee: St. Florian Company, Ltd., Phoenix, Ariz.

[21] Appl. No.: 454,999

[22] Filed: Jan. 3, 1983

[51] Int. Cl.³ .................. B23Q 17/00; B23Q 3/00
[52] U.S. Cl. ...................................... 29/407; 29/464; 384/428
[58] Field of Search .............. 29/407, 464; 29/148.5; 384/428; 277/1

[56] References Cited

U.S. PATENT DOCUMENTS 3,847,703 11/1974 Kaiser .................................. 29/464
3,965,557 6/1976 Pruitt .................................. 29/464
4,335,923 6/1982 Dömer .............................. 384/428

Primary Examiner—Howard N. Goldberg
Assistant Examiner—Steven E. Nichols
Attorney, Agent, or Firm—Cahill, Sutton & Thomas

[57] ABSTRACT

In a method for aligning multiple shaft supporting journal bearings without mechanical shimming, the shaft itself is employed as the aligning element for the journal bearings. Misalignment and spacing differences and discontinuities between the bases of the journal bearings and the respective supporting surfaces are accommodated by a curable and incompressible when cured compound placed therebetween which compound conforms with such spacing differences and discontinuities prior to curing.

12 Claims, 5 Drawing Figures

PROCESS FOR TRUING A PLURALITY OF JOURNAL BEARINGS TO A COMMON BORE AXIS

The present invention relates to an apparatus and a process for rotatably mounting a shaft and, more particularly, to an apparatus and a process for aligning a plurality of common bore axis bearings.

To mount a rotatable shaft in a plurality of journals necessitates time consuming alignment of the journals to insure lack of binding and permit the shaft to rotate freely. Several sources contributing to binding are present and each source must be elminated. Usually, the journals employed are known generically as journal bearings and sometimes referred to as pillow blocks. A journal bearing includes a bore formed by a base and a cap attached thereto. In inexpensive journal bearings, the bore itself serves as the bearing surface. More often, a babbitt lined bearing surface is cast into the base and cap. In yet more expensive journal bearings, other split bearing surface elements are located within the bore to contactingly support an inserted shaft.

Because of manufacturing tolerances, the size of supposedly identical bores within a plurality of journal bearings may have some variation. The positioning of the bore with respect to the mounting surface of the base will vary horizontally and vertically between supposedly identical journal bearings. Manufacturing tolerances often result in discrepancies in alignment between the axis of the bore of a journal bearing with the plane defined by the mounting surface of the base; that is, the mounting surface may be tilted with respect to the bore axis. The bearing surface elements used in journal bearings are not necessarily absolutely uniform in thickness nor are they sized exactly the same or in absolute conformance with the bore within which they may be located. The supporting surfaces to which the journal bearings are attached usually present variations in height and the plane of one supporting surface may not be absolutely parallel with the plane of another supporting surface.

Accordingly, alignment of a plurality of journal bearings on a common axis of rotation usually requires vertical adjustment, canting and lateral shifting of the journal bearings to obtain alignment of the bore axis.

The conventional manner for obtaining alignment of the bore axis in a plurality of journal bearings is that of shimming the journal bearings upon their respective supporting surfaces with brass shims or the like. This process is very time consuming and requires a high degree of skill. Even after an initial alignment is obtained some misalignment may result when the bolts securing the journal bearings to the supporting surfaces are torqued to a predetermined parameter. Such misalignment may result from compression or shifting of the shims or compression of foreign matter introduced between the journal bearings and the supporting surfaces.

The apparatus and process to be described obviates the above noted problems by eliminating the attempt to align the respective bore axis through positioning of the journal bearings upon the supporting surface. Instead, the bore axis of the journal bearings are aligned with one another by securing the journal bearings to the shaft. Thereafter, a curable hardenable and incompressible when cured compound is placed upon the journal bearing supporting surface to accommodate and fill any spaces or voids intermediate the mounting surfaces of the journal bearings and the supporting surfaces. Thereby, the integrity of the alignment of the bore axis of the journal bearings remains totally undisturbed during mounting of the journal bearings upon the supporting surfaces. Because the compound is incompressible after curing, final torquing of bolts securing the journal bearings to the supporting surfaces will not disturb the alignment.

It is therefore a primary object of the present invention to provide a method for aligning the bore axis of a plurality of journal bearings by employing the to be supported rotatable shaft as an aligning element.

Another object of the present invention is to provide apparatus for aligning the bore axis of a plurality of journal bearings.

Yet another object of the present invention is to provide a method for conforming shaft mounted journal bearings with journal bearing supporting surfaces.

Still another object of the present invention is to provide a method for aligning the bore axis of a plurality of journal bearings without imposing binding loads upon a supported shaft.

A further object of the present invention is to provide a simplified method for laterally, longitudinally and vertically locating journal bearings upon respective supporting surfaces to maintain aligned the bore axis of the journal bearings.

A yet further object of the present invention is to provide apparatus and a method for automatically accommodating for tolerance differences between similar but not identical multiple journal bearings mounted on a shaft.

A still further object of the present invention is to provide a method for accommodating rather than eliminating the primary causes for misalignment of multiple journal bearings supporting a common shaft.

These and other objects of the present invention will become apparent to those skilled in the art as the description thereof proceeds.

The present invention may be described with greater specificity and clarity with reference to the drawings, in which.

Figure 1:
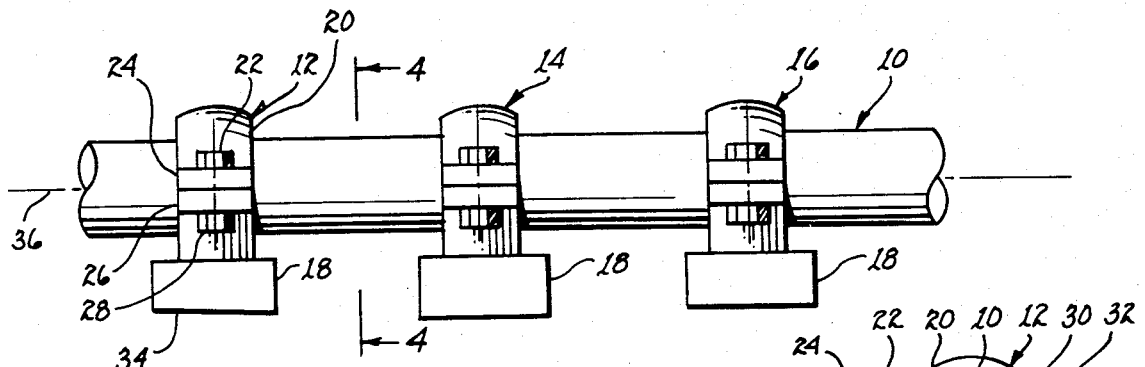
FIG. 1 illustrates a plurality of similar journal bearings mounted upon a shaft.
Figure 4:
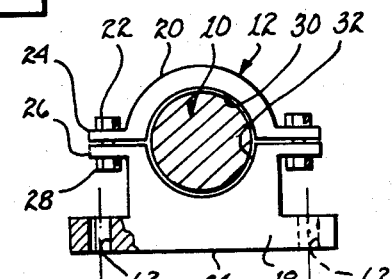
FIG. 4 is a cross-sectional view taken along lines 4—4, as shown in FIG. 1.

Referring jointly to FIGS. 1 and 4, there is illustrated a shaft 10 rotatably mounted within pillow blocks or journal bearings 12, 14 and 16. Bearings of this type are generally a casting including a base member 18 and a cap 20, as shown with respect to journal bearing 12. The cap is secured to the base by means of bolts extending through laterally located ears 24 of the cap into the base itself or through a laterally extending ear 26, as shown. In the latter case, bolt 22 is tightened by means of a nut 28. Shaft 10 may be mounted directly within bore 30 of the journal bearing or the journal bearing may include a babbitt bearing surface 32; other types of split bearing surfaces or ball and roller bearing pillow blocks which do not have split bearing surfaces may also be employed.

The size of the bore in similar bearings will vary depending upon the degree of tolerance to which the base and cap of the journal bearing are manufactured. Like wise, the bearing surface insert, if used, may have variations in thickness. Each of these variations in tolerance may produce or be the cause of bore axis misalignment between two or more journal bearings.

Normal manufacturing tolerances in journal bearings may cause variations, laterally and vertically of bore 30 with respect to base 18. Therefore, alignment of the bases of two or more journal bearings will not necessarily result in alignment of the respective bore axis and a further potential cause for binding of a retained shaft may exist.

Mounting surface 34 of base 18 may not always be parallel with the bore axis of the respective journal bearing and it may not always be perpendicular to a vertical plane extending through the bore axis. Thus, a further potential cause for binding of a retained shaft exists. Commensurate therewith, the vertical distance between the bore axis and the mounting surface may vary from journal bearing to journal bearing.

Referring particularly to FIG. 1, mounting surface 34 of journal bearing 12 is shown in exagerated form for illustrative purposes as canted with respect to longitudinal axis 36 of shaft 10. Base 18 of journal bearing 14 is shown as having greater depth than the depth of the base of journal bearing 12 and base 18 of journal bearing 16 is shown as having lesser depth than that of journal bearing 12.

Normally, conventional practice would indicate that the discrepancies shown in FIG. 1 of the various journal bearing bases would be accommodated by shimming the bases. Such shimming will ultimately result in alignment of the bore axis of the plurality of journal bearings but the method is a cut and try method and therefore very time consuming. Moreover, a high degree of skill is required to obtain alignment within a commercially feasiable time period. Even if all of the bases were absolutely uniformly sized and vertically located with respect to the individual bore axis, some shimming would probably have to be done to accommodate tolerance variations of the bores and the bearing surfaces mounted therein.

Figure 2:
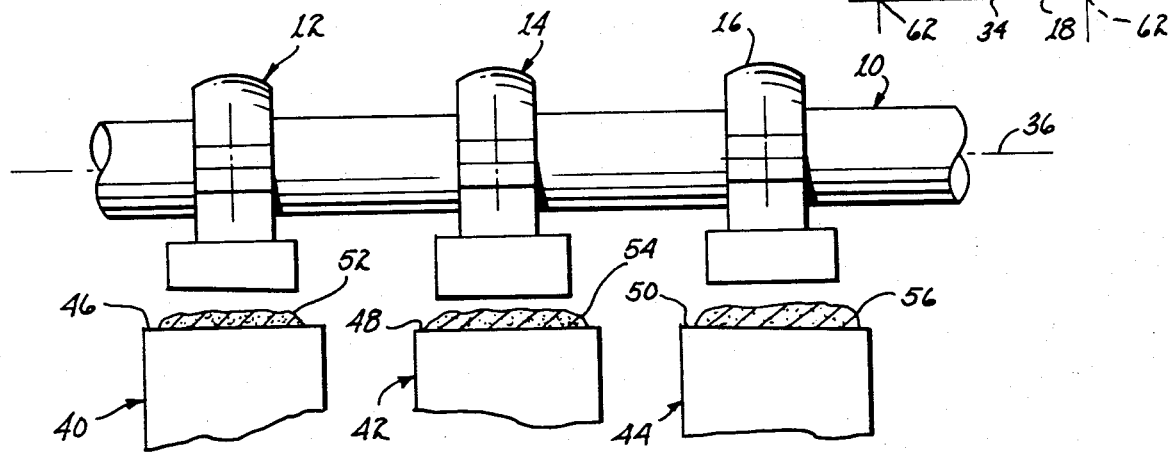
FIG. 2 illustrates normal tolerance differences which can result in misalignment of a multi-bearing supported shaft.

Referring to FIG. 2, there is illustrated a yet further problem attendant bore alignment. Supports 40, 42, 44, corresponding with journal bearings 12, 14 and 16, have supporting surfaces 46, 48 and 50, respectively, which are not always aligned with one another in a common plane. In example, supporting surface 46 is shown as planar to but vertically upwardly displaced from supporting surface 48; and, supporting surface 50 is shown as canted with respect to supporting surface 48. These deficiencies will result in misalignment of the bore axis of the journal bearings mounted thereon unless corrected. As with the journal bearing bases, correction is usually effected by shimming.

Figure 3:
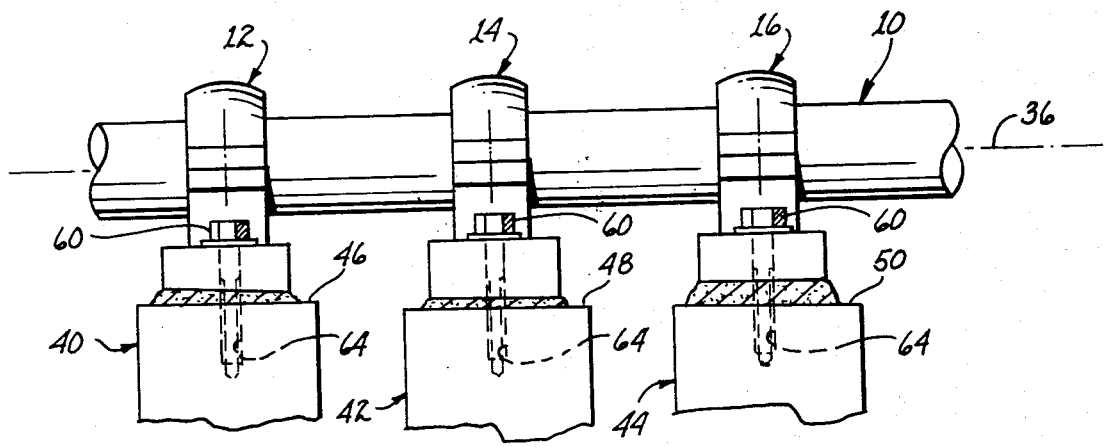
FIG. 3 illustrates structure for accommodating any misalignment or discontinuities between each of a plurality of journal bearings and the respective supporting surfaces.

Referring jointly to FIGS. 2 and 3 there is illustrated a method for totally avoiding the laborious time consuming shimming process. First, journal bearings 12, 14, and 16 are mounted upon shaft 10 at the appropriate locations therealong for mating correspondence with the respective supports. After mounting, freedom of rotation of the shaft within the bearing is checked to insure that no binding of any of the journal bearings is present. For reasons stated above, the journal bearings may or may not be in perfect alignment with one another; however, the bore axis of each journal bearing is in alignment with the bore axis of all other journal bearings since the shaft, which is initially trued, is used as the alignment tool. The misalignment and discontinuities attendant the journal bearing castings and that of the supporting surfaces is accommodated as follows.

A cureable, hardenable compound referred to in the trade as plastic steel manufactured by various concerns, such as Devcon Corp., is placed upon the respective supporting surfaces and identified by numerals 52, 54 and 56. It is understood that water curing compounds, cement, plaster and other hardenable materials may also be used. Usually, a layer or film of 15/1000 of an inch or less suffices to accommodate the extent of discontinuities and misalignment present but in some applications the thickness may be as much as 30/1000 of an inch. The journal bearings, still mounted upon the shaft are placed upon the respective compound covered supporting surfaces. The resulting compression upon the respective layers of compound is proportionate to the extent of vertical discontinuity and results in a flow of the respective compounds until all pressures intermediate the respective base mounting surfaces and supporting surfaces are equalized. The flow insures that all spaces or voids between the mated surfaces are filled. It may be noted that essentially no pressure is exerted upon shaft 10 during placement of the journal bearings upon the respective supports and therefore the shaft will be relaxed and there will exist no tendency for the shaft to bend or otherwise cause misalignment between the respective bearing surfaces and the shaft.

After curing, compounds 52, 54 and 56 provide an essentially incompressible spacing element intermediate the respective mounting surfaces and supporting surfaces which has conformed to and been accommodated with any existing misalignment or discontinuities. Thus, the compounds serve as custom fitted seats for each journal bearing.

Incompressibility of the cured compound is achieved through the composition of the compound. Preferably, the compound comprises a cureable resin impregnated with particulate matter, such as steel or other hard essentially noncompressible materials. After curing, the resin serves primarily as simply a binder to retain the particulate matter in place and all compressive loads imposed upon the compound are supported directly by the particulate matter and not the resin. Thereby, the compound is in the nature of a uniquely contoured steel seat for all practical purposes.

After the compound has cured, shaft 10 is rotated to insure continuing freedom of rotation and lack of binding. Thereafter, bolts 60, or other means are penetrably mounted through apertures 62 (see FIG. 4) in base 18 of each journal bearing for threaded engagement with corresponding threaded apertures 64 in the respective supports. Usually bolts 60 are torqued to a predetermined torque to insure stability of the journal bearings. Because compounds 46, 48 and 50 are in the nature of metallic seats, such torquing will cause no compression thereof. However, good practice dictates final rotation of shaft 10 to insure that no binding in the bearings has occured.

Figure 5:
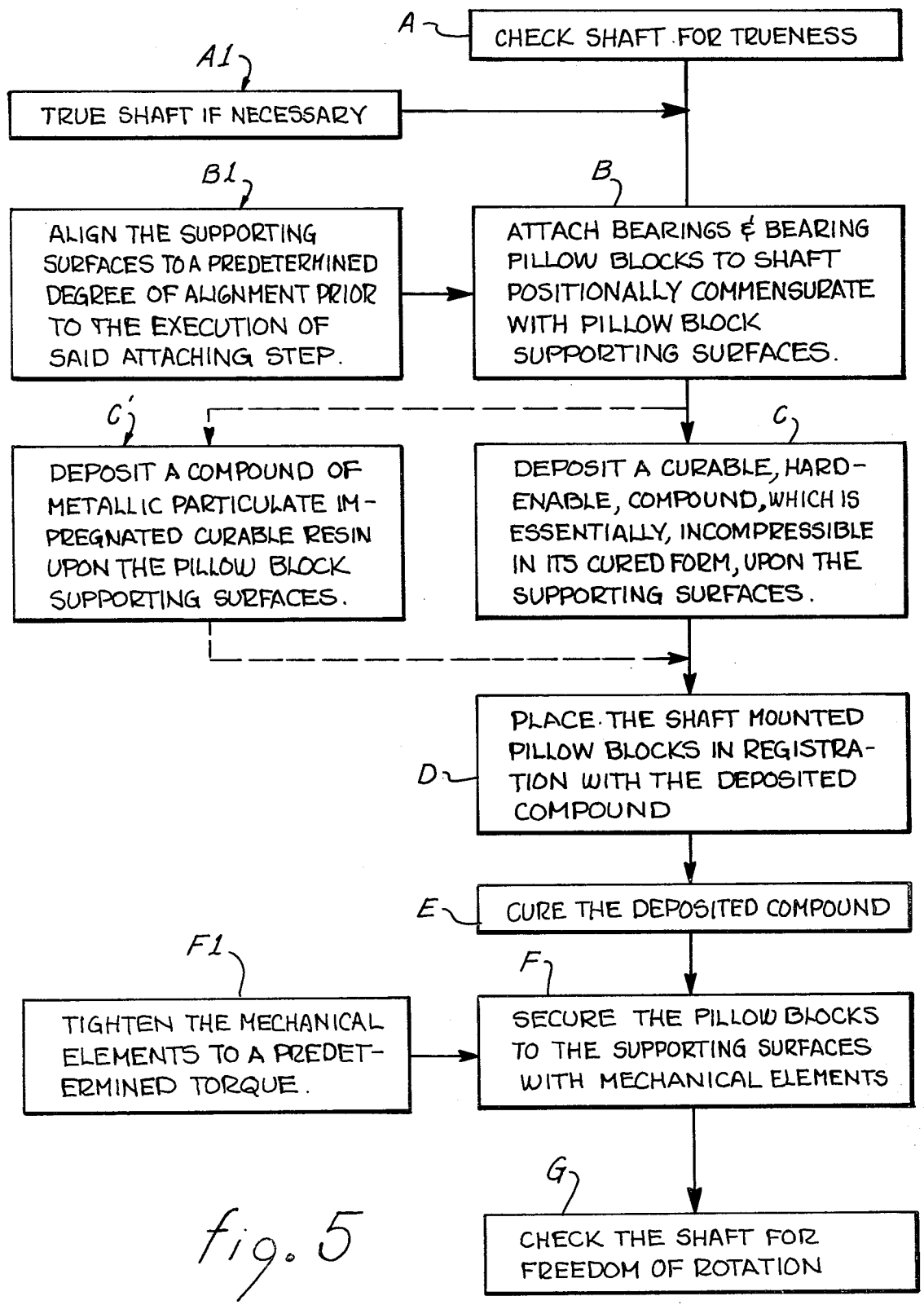
FIG. 5 illustrates various steps embodying a process for aligning the bore axis of multiple journal bearings rotatably supporting a common shaft.

Referring to FIG. 5, there is illustrated a flow diagram depicting various steps for carrying out the above described process. Step A contemplates checking shaft 10 for trueness. If the shaft is not true, step A1 is undertaken to true the shaft. Normally, for high tolerance applications, a runout of 1/1000 of an inch in five feet is more than adequate. The bearings and bearing pillow blocks or journal bearings are attached in step B to the shaft in the appropriate positions therealong to match the displacement of the respective supports. Initial alignment of the supporting surfaces with one another is undertaken in step B1 either before or after exercise of step B.

Step C contemplates the deposition of a cureable hardenable compound upon the respective supporting surfaces. Depending upon the degree of pressure to be exerted by the pillow block bases upon the supporting surfaces, the resin may be impregnated with metallic particulate matter, as recited in alternate step C'. After deposition of a layer of compound upon supporting surfaces, step D contemplates placing the pillow blocks in registration upon the compound deposited on the respective supporting surfaces. Before any pressure is placed upon the shaft or the pillow blocks, the compound is allowed to flow and accommodate conformance with any surface irregularities or surface misalignment between the mated surfaces and cured to form a seat. Step F includes securing the pillow blocks to the supporting surfaces with mechanical elements such as the bolts described above. When required, the bolts may be torqued to a predetermined degree, as recited in step F1.

To ensure that the bore axis of the respective pillow blocks have not become misaligned during steps E and F (F1), the shaft is checked for freedom of rotation, as recited in Step G.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A method for aligning multiple journal bearings supporting a common shaft, said method comprising the steps of:
    (a) attaching a plurality of journal bearings upon the shaft;
    (b) depositing a curable hardenable compound upon the supporting surface for each of the journal bearings;
    (c) placing the shaft mounted journal bearings upon the respective supporting surface;
    (d) curing the compound; and
    (e) securing each of the journal bearings to its respective supporting surface with mechanical elements.

2. The method as set forth in claim 1 including the step of checking the shaft for trueness with a predetermined parameter and the step of truing the shaft to the predetermined parameter, if necessary.

3. The method as set forth in claim 1 including the step of checking the shaft for freedom of rotation subsequent to said securing step.

4. The method as set forth in claim 1 wherein said securing step includes the step of bolting the journal bearings to the respective supporting surfaces and including the step of torquing the bolts to a predetermined torque.

5. The method as set forth in claim 1 wherein said depositing step comprises the step of depositing a compound of metallic particulate impregnated curable resin.

6. The method as set forth in claim 1 including the step of pre-aligning the supporting surfaces prior to execution of said depositing step.

7. The method as set forth in claim 2 wherein said depositing step comprises the step of depositing a compound of metallic particulate impregnated cureable resin.

8. The method as set forth in claim 7 including the step of pre-aligning the supporting surface prior to execution of said depositing step.

9. The method as set forth in claim 8 wherein said securing step includes the step of bolting the journal bearings to the respective supporting surfaces and including the step of torquing the bolts to a predetermined torque.

10. The method as set forth in claim 9 including the step of checking the shaft for freedom of rotation subsequent to said torquing step.

11. The method as set forth in claim 9 wherein said step of attaching includes the step of attaching at least three journal bearings to the shaft.

12. The method as set forth in claim 2 including the step of truing the shaft to one thousandth of an inch runout in five feet.

* * * * *